US 6,728,169 B2

(12) United States Patent
Deo

(10) Patent No.: US 6,728,169 B2
(45) Date of Patent: Apr. 27, 2004

(54) DISK CHANGER

(75) Inventor: Hisao Deo, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 73 days.

(21) Appl. No.: 10/091,298

(22) Filed: Mar. 6, 2002

(65) Prior Publication Data

US 2002/0131336 A1 Sep. 19, 2002

(30) Foreign Application Priority Data

Mar. 6, 2001 (JP) .......................... 2001-061736

(51) Int. Cl.⁷ .............................................. G11B 33/02
(52) U.S. Cl. .................... 369/30.95; 360/30.93
(58) Field of Search ................... 369/30.95, 30.93, 369/75.1–75.2, 77.1–77.2, 178

(56) References Cited

U.S. PATENT DOCUMENTS 5,084,854 A * 1/1992 Ikedo et al. ............... 369/75.1
5,251,192 A * 10/1993 Liu .......................... 369/30.95
5,555,227 A * 9/1996 Kurosu ...................... 369/77.1

FOREIGN PATENT DOCUMENTS

JP 09-147468 6/1997

* cited by examiner

Primary Examiner—Allen Cao
(74) Attorney, Agent, or Firm—Crowell & Moring LLP

(57) ABSTRACT

If a disk tray, i.e., a rotary tray, is undulated, it is impossible to stabilize a rotating torque of the disk tray, thus causing unevenness in rotation of the tray. A rotary tray is supported from below at a peripheral edge portion of its lower surface by means of rollers which are arranged at equal intervals on a circumference centered at a support shaft, and with a biasing force of a spring, the rotary tray is pressed toward an upper surface of a slide tray, so that the rotary tray is installed warpedly in a downwardly convex shape as a whole. Consequently, undulation of the rotary tray which occurred at the time of resin molding is eliminated and the rotary tray comes into uniform abutment against the rollers, whereby it becomes possible to stabilize the rotating torque of the rotary tray and eliminate unevenness in rotation of the rotary tray.

7 Claims, 9 Drawing Sheets

DISK CHANGER

BACKGROUND OF THE INVENTION

1. Field of the Invention

The present invention relates to a disk changer and more particularly a disk changer which moves a disk holding tray, i.e., a disk tray, up to a predetermined rotational position.

2. Description of the Prior Art

As a conventional disk changer there is known a disk changer disclosed in Japanese Published Unexamined Patent Application No. Hei 9-147468. On a chassis of this disk changer is placed a disk-shaped tray, i.e., a disk tray, which is mounted on a rotating shaft of a spindle motor. Plural disks are received circumferentially on an upper surface of the disk tray.

In this construction, when the spindle motor operates, the disk tray rotates with a driving force which is transmitted thereto from the spindle motor, causing any of the disks received in the upper surface thereof to rotate up to a position opposed to a pickup, thereby permitting the disk to be held by a chuck arm.

The above conventional disk changer involves the following problem.

In a disk changer, a disk tray is usually formed by molding resin in a large-sized disk shape so as to permit plural disks to be received thereon. Consequently, a rotational surface of the disk tray is apt to be undulated in the molding.

With such undulation, when the disk tray is to be supported at a peripheral edge of its lower surface or thereabouts by means of plural rollers arranged on an upper surface of the chassis, there occur variations in the state of abutment between the lower surface of the disk tray and each roller, thus making it impossible to impart a uniform rotating torque to the disk tray. Unevenness in rotation may result.

SUMMARY OF THE INVENTION

The present invention has been accomplished in view of the above-mentioned problem and it is an object of the invention to provide a disk changer which can stabilize a rotating torque of a disk tray and thereby eliminate unevenness in rotation.

According to the present invention, for achieving the above object, there is provided a disk changer comprising:

a slide tray made of resin in a square plate shape, the slide tray having a circular recess and rollers and being installed in a manner capable of being drawn out from a cabinet body, the circular recess being formed in an upper surface of the slide tray so as to face upward around a cylindrical support shaft, the rollers being arranged at equal intervals in three positions on a circumference on the upper surface of the slide tray which circumference is centered at the support shaft, while allowing rotating shafts of the rollers to be oriented radially of the circular recess;

a disk tray made of resin, the disk tray having a tray axial bore formed axially thereof and into which the support shaft is inserted rotatably, an annular recess formed in an upper surface of the disk tray in a surrounding relation to the tray axial bore, disk receptacle portions formed circumferentially at equal intervals in five positions on the upper surface of the disk tray, and a ring gear disposed on a circumference on a lower surface of the disk tray which circumference is centered at the tray axial bore, the ring gear being engageable with a driving gear, the disk tray being placed in the circular recess of the slide tray while being supported at a peripheral edge of its lower surface and thereabouts by means of the rollers; and a chuck arm made of resin, the chuck arm having an arm axial bore formed on one end side thereof and into which the support shaft is inserted, an annular recess formed in a lower surface of the chuck arm in a surrounding relation to the arm axial bore, the annular recess being able to confront the annular recess formed in the disk tray, and a through hole formed on an opposite side of the chuck arm and able to confront a central part of each of the disk receptacle portions, the chuck arm being mounted to the support shaft while allowing a spring to be accommodated within a space which is formed by making the annular recesses confront each other, the spring being disposed so that it can expand and contract axially of the support shaft.

In the present invention constructed as above, the slide tray made of resin in a square plate shape and provided in an upper surface thereof with a circular recess which faces upward around the cylindrical support shaft, is disposed so that it can be drawn out from a cabinet body.

In the slide tray made of resin, rollers having rotating shafts oriented radially of the circular recess are arranged at equal intervals in three positions on a circumference which is centered at the support shaft. The resinous disk tray with the support shaft inserted into the tray axial bore is placed on the circular recess while being supported at the peripheral edge of its lower surface and thereabouts by the rollers. Disks are received respectively within the disk receptacle portions which are formed at equal intervals in five circumferential positions on the upper surface of the disk tray. A driving gear is brought into mesh with the ring gear which is disposed on a circumference on the lower surface of the disk tray which circumference is centered at the tray axial bore, and the disk tray is rotated with a driving force which is transmitted to the disk tray from a drive motor through the driving gear.

The chuck arm made of resin is mounted to the support shaft while inserting the support shaft into the arm axial bore. At this time, a spring adapted to expand and contract axially of the support shaft is received within a space which is defined by the annular, or ring-shaped, recess formed in the upper surface of the disk tray in a surrounding relation to the support shaft and the annular, or ring-shaped, recess formed in the lower surface of the chuck arm in a surrounding relation to the arm axial bore. The through hole formed on the opposite end side of the chuck arm comes into opposition to a central part of the disk accommodated within each disk receptacle portion to chuck the disk.

Thus, since the disk tray made of resin is supported from below at the peripheral edge of its lower surface and thereabouts by means of the rollers and its axis and the vicinity thereof are pressed down with the biasing force of the foregoing spring, the disk tray as a whole assumes a downwardly warped state and absorbs undulation, so that there is attained a uniform abutment of its lower surface with the rollers and hence the rotating torque is stabilized.

Thus, according to the present invention it is possible to realize, in terms of a concrete construction, a disk changer which can stabilize the rotating torque of the disk tray and thereby eliminate unevenness in rotation.

Although the present invention is realized as a disk changer having a concrete construction, such a construction is a mere example and the technique contemplated by the invention can be grasped over a wide scope.

More specifically, the present invention may have a construction comprising a disk tray which receives plural disks on a surface thereof, a drive mechanism for rotating the disk tray, a chassis provided with plural rollers which support the disk tray rotatably on a back side of the same tray, and a support shaft structure which urges the disk tray toward the chassis while supporting the disk tray rotatably about an axis of the disk tray relative to the chassis.

In this construction, plural rollers disposed on the chassis support the back side of the disk tray rotatably, the disk tray being rotated by a drive mechanism. On the surface side of the disk tray there can be accommodated plural disks.

The support shaft structure urges the disk tray toward the chassis while supporting the disk tray rotatably about the axis of the same tray with respect to the chassis. Therefore, when the disk tray is displaced in the vicinity of its axis toward the chassis, it assumes a warped state as a whole. As a result, undulation of the disk tray is eliminated and the state of abutment thereof with the portion which supports the same tray becomes uniform, thus stabilizing the rotating torque of the disk tray during rotation of the tray.

From the standpoint of permitting the occurrence of undulation, it is optional whether the disk tray is formed by molding resin or by metal working. No limitation is placed on the material thereof.

Likewise, it is optional whether this disk changer is to be used while orienting the disk tray in the horizontal direction or in the vertical direction. In which direction the disk tray is to be oriented in use is not specially limited.

Thus, according to the above construction it is possible to provide a disk changer which can stabilize the rotating torque of the disk tray to eliminate unevenness in rotation.

As an example of a concrete construction of the support shaft structure as referred to herein there may be adopted a construction provided with a spring, the spring being able to expand and contract in the axial direction of the disk tray, one end of the spring being spaced a predetermined distance from the chassis and positioned there, an opposite end of the spring being pressed against a vicinity of the disk tray axis from the side opposite to the chassis.

In this construction, one end of the spring disposed so as to expand and contract axially the disk tray is positioned while being spaced a predetermined distance from the chassis. On the other hand, the opposite end of the spring is pressed against a vicinity of the disk tray axis from the side opposite to the chassis.

Thus, the spring urges the disk tray in the vicinity of the tray axis toward the chassis, causing the disk tray to be warped as a whole, thereby eliminating undulation of the disk tray and stabilizing the rotating torque of the same tray.

The use of such a spring in the support shaft structure is advantageous in that the biasing force of the spring can be changed easily by adjusting the spring constant or by adjusting the state of expansion and contraction when installed. But this construction is a mere example and there also may be used a resinous member having elasticity.

The support shaft structure can thus be realized by a concrete construction.

As an example of construction for eliminating undulation of the disk tray effectively when the vicinity of the disk tray axis is urged toward the chassis, there may be adopted a construction wherein the disk tray is formed by molding while the vicinity of the disk tray axis is displaced away from the chassis, causing the whole of disk tray to be warped in an arcuate sectional shape.

According to this construction, the disk tray is formed by molding resin while it is displaced away from the chassis in the vicinity of its axis and is thereby warped in an arcuate sectional shape as a whole, so when the vicinity of the disk tray axis is urged toward the chassis by the support shaft structure, the warping direction of the disk tray is inverted into a downwardly convex warp and in this state the disk tray is installed.

Consequently, the entire shape of the tray can be greatly changed while eliminating undulation of the tray not only during the period from a generally planar state until a downwardly convex state but also during the period from an upwardly convex state until a generally planar state, thus making it possible to eliminate undulation of the disk tray in a more positive manner.

Further, as an example of construction for warping the disk tray efficiently when the vicinity of the disk tray axis is urged toward the chassis, there may be adopted a construction wherein the chassis portion opposed to the vicinity of the disk tray axis is depressed as a recess in a direction away from the disk tray.

According to this construction, when the vicinity of the disk tray axis is urged toward the chassis by the support shaft structure, the disk tray is pressed toward the recess formed by depressing the chassis portion opposed to the vicinity of the tray axis in a direction away from the disk tray. As a result, the vicinity of the disk tray axis becomes easier to be displaced toward the chassis and hence it becomes easier to eliminate undulation of the disk tray.

Thus, undulation of the disk tray can be eliminated easily.

DESCRIPTION OF THE PREFERRED EMBODIMENTS

Figure 1:
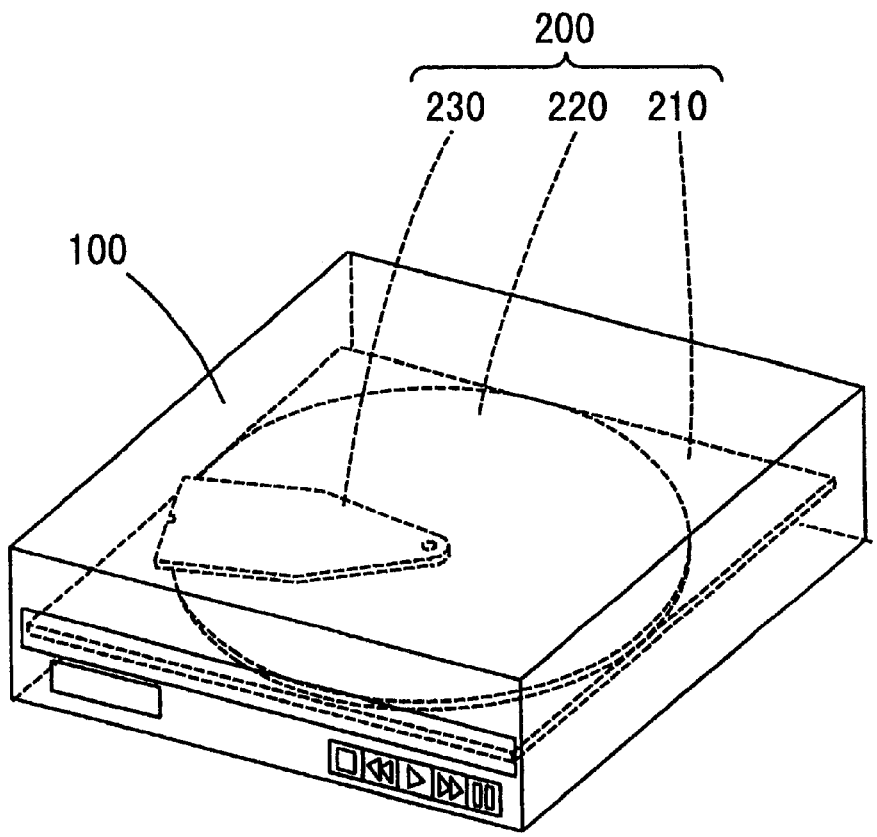
FIG. 1 is a perspective view showing an appearance of a DVD (digital video disk) reproducing apparatus according to an embodiment of the present invention.

Embodiments of the present invention will be described hereinunder with reference to the accompanying drawings and in accordance with the following order:

(1) Outline of a DVD reproducing apparatus
(2) Construction of a disk changer
(3) Modified disk changers
(1) Construction of a DVD Reproducing Apparatus FIG. 1 is a perspective view showing an appearance of a DVD reproducing apparatus according to an embodiment of the present invention.

In the same figure, a disk changer 200 is accommodated within a cabinet 100 which is in the shape of a square box. The disk changer 200 is provided with a slide tray 210 which is like a square plate. A disk-shaped rotary tray 220 is supported rotatably on an upper surface of the slide tray 210 and a chuck arm 230 is supported at a predetermined position on an upper surface of the rotary tray 220. The slide tray 210 and the rotary tray 220 constitute the chassis and the disk tray, respectively, which are referred to in the present invention.

Though not shown, on a lower surface of the slide tray 210 are disposed a mechanical holder with a pickup mounted thereon at a position opposed to the chuck arm 230 and a drive motor as the drive mechanism referred to herein for rotating the rotary tray 220.

Further, below the mechanical holder and the drive motor is accommodated a control substrate through a shield structure.

(2) Construction of a Disk Changer

Figure 2:
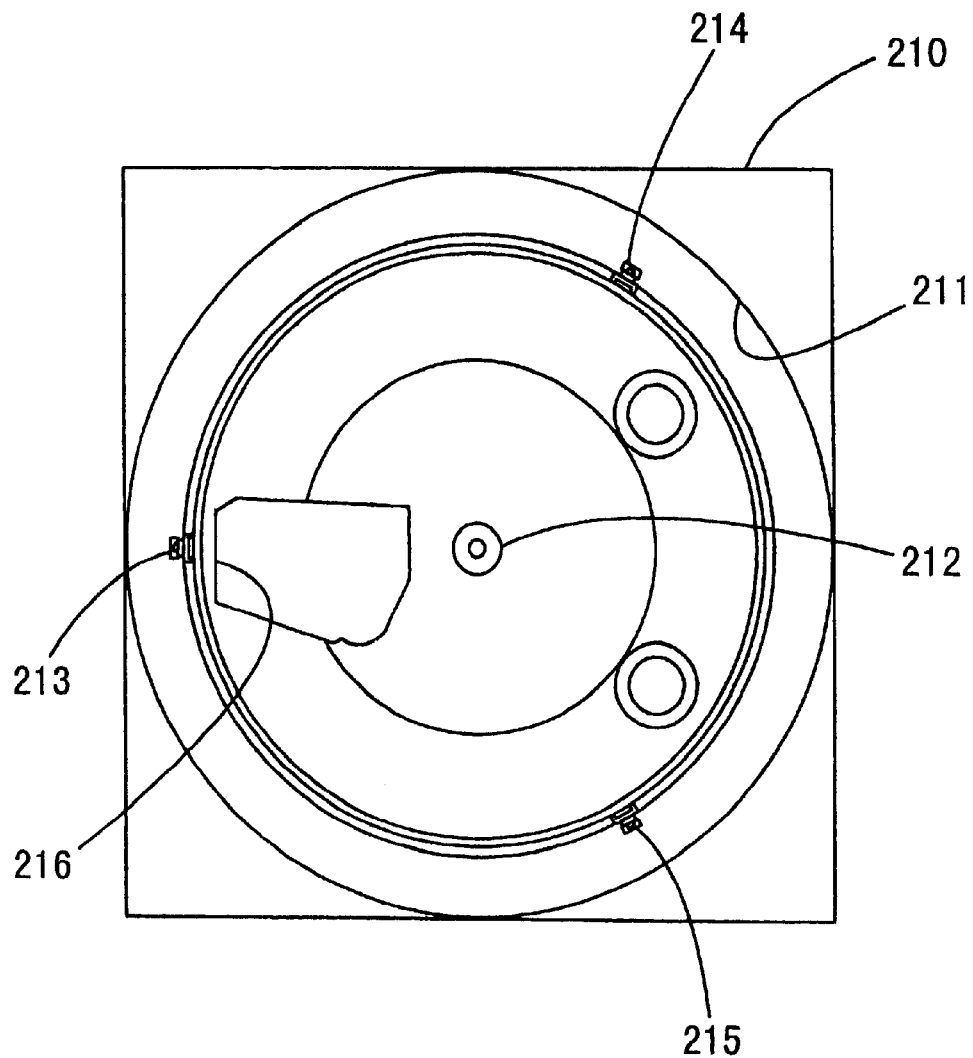
FIG. 2 is a plan view showing an upper surface construction of a slide tray.

FIG. 2 is a plan view showing an upper surface construction of the slide tray 210.

In an upper surface of the slide tray 210 is formed a circular recess 211 which permits the rotary tray 220 to be placed thereon. Centrally of the recess 211 is erected a cylindrical support shaft 212. Three rollers 213 through 215 are disposed at equal intervals on a circumference which is centered at the support shaft 212. The rollers 213 through 215 are arranged so that their rotating shafts are oriented radially of the said circumference. A through hole 216 is formed between one roller 213 and the support shaft 212 and the pickup mounted on the mechanical holder is located below the through hole 216.

Figure 3:
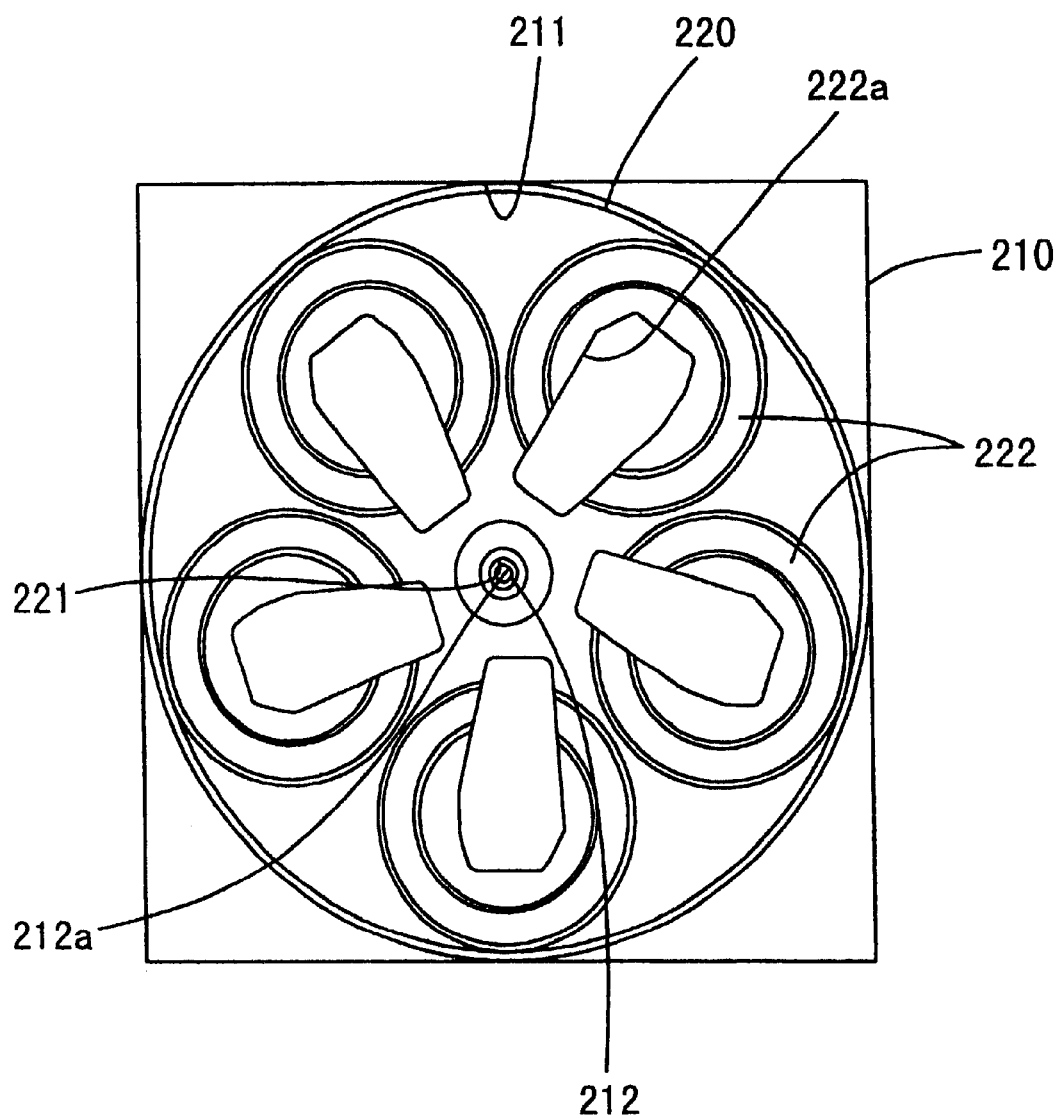
FIG. 3 is a plan view showing an upper surface construction of the slide tray with a rotary tray placed thereon.

As shown in FIG. 3, the rotary tray 220 is axially formed with a tray axial bore 221 into which the support shaft 212 can be inserted. The rotary tray 220 is placed onto the slide tray 210 while the support shaft 212 is inserted into the tray axial bore 221, allowing a peripheral edge of a lower surface of the rotary tray and the vicinity thereof to come into abutment against the rollers 213 through 215.

On the upper surface of the rotary tray 220 are formed disk receptacle portions 222 circumferentially at equal intervals in five positions, the disk receptacle portions 222 being each able to receive a DVD therein. The disk receptacle portions 222 are each formed with an opening 222a which can come into communication with the through hole 216 when the rotary tray 220 has rotated up to the position opposed to the through hole 216. A ring gear is disposed on the lower surface of the rotary tray 220 and on a circumference centered at the tray axial bore 221. A drive gear mounted on a shaft of a drive motor is brought into mesh with the ring gear.

Figure 4:
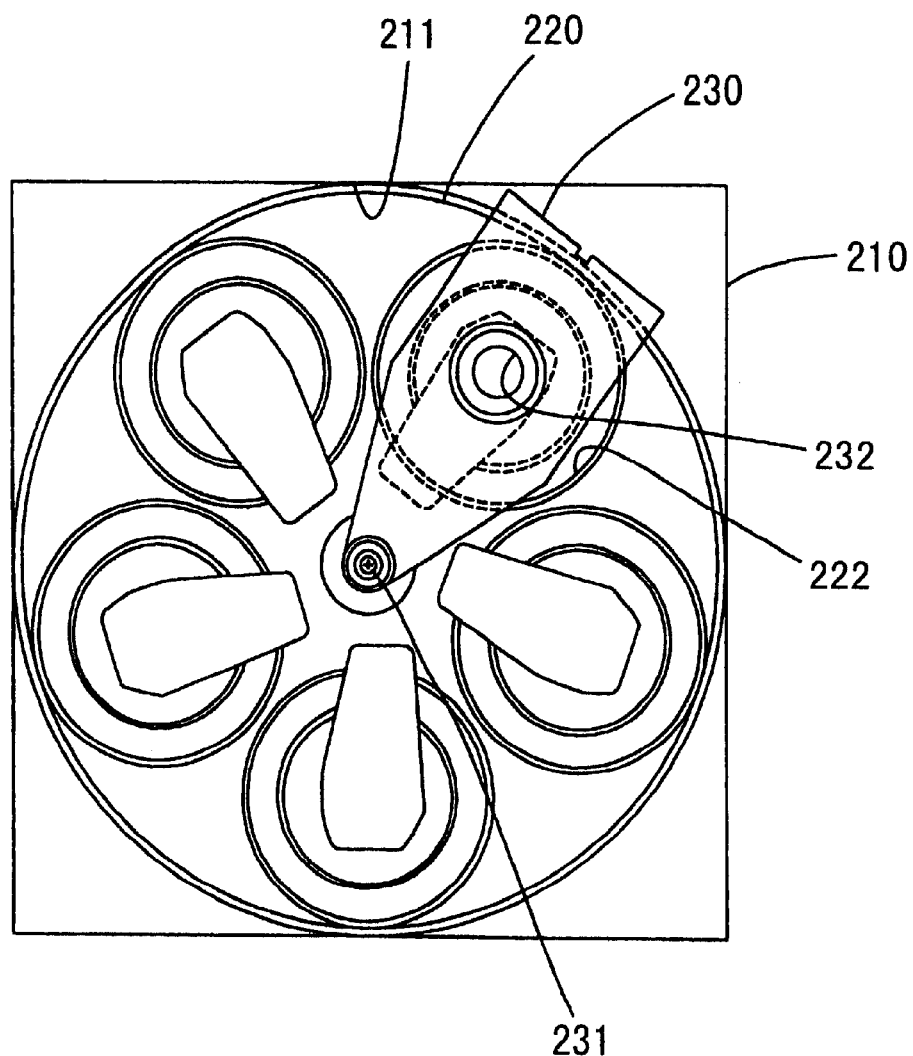
FIG. 4 is a plan view showing an upper surface construction of the slide tray with a chuck arm secured thereto with screw.

A screw hole 212a is formed from above through the axis of the support shaft 212. As shown in FIG. 4, an arm axial bore 231 formed in one end of the chuck arm 230 is brought into communication with the screw hole 212a and a screw is driven toward the screw hole 212a from above the arm axial bore 231, whereby the chuck arm 230 is fixed to the support shaft 212. On an opposite side of the chuck arm 230 is formed a through hole 232 vertically. When chucking a DVD accommodated in a disk receptacle portion 222, the through hole 232 can communicate with a through hole formed centrally of the DVD.

According to this construction, when the DVD to be reproduced is changed from one to another, the drive motor turns ON, whereupon the rotary tray 220 rotates in a predetermined direction around the support shaft 212 with the driving force of the drive motor. At this time, the rollers 213~215 support the lower surface of the rotary tray 220 while rotating in the same direction.

However, since the rotary tray 220 is formed by molding resin in such a large disk shape as permits accommodation of plural DVDs therein, its rotational surface is apt to undergo undulation. With undulation, it is difficult to let the rotary tray 220 abut against the rollers 213 through 215 uniformly throughout the whole circumference. For example, there occurs a state in which the rotary tray, at a certain portion thereof, is pushed strongly against the rollers 213~215, while at another portion thereof the rotary tray is not abutted sufficiently against the rollers. In this state the peripheral edge portion of the rotary tray cannot be fed with a uniform force in its rotational direction, thus causing unevenness in rotation.

Figure 5:
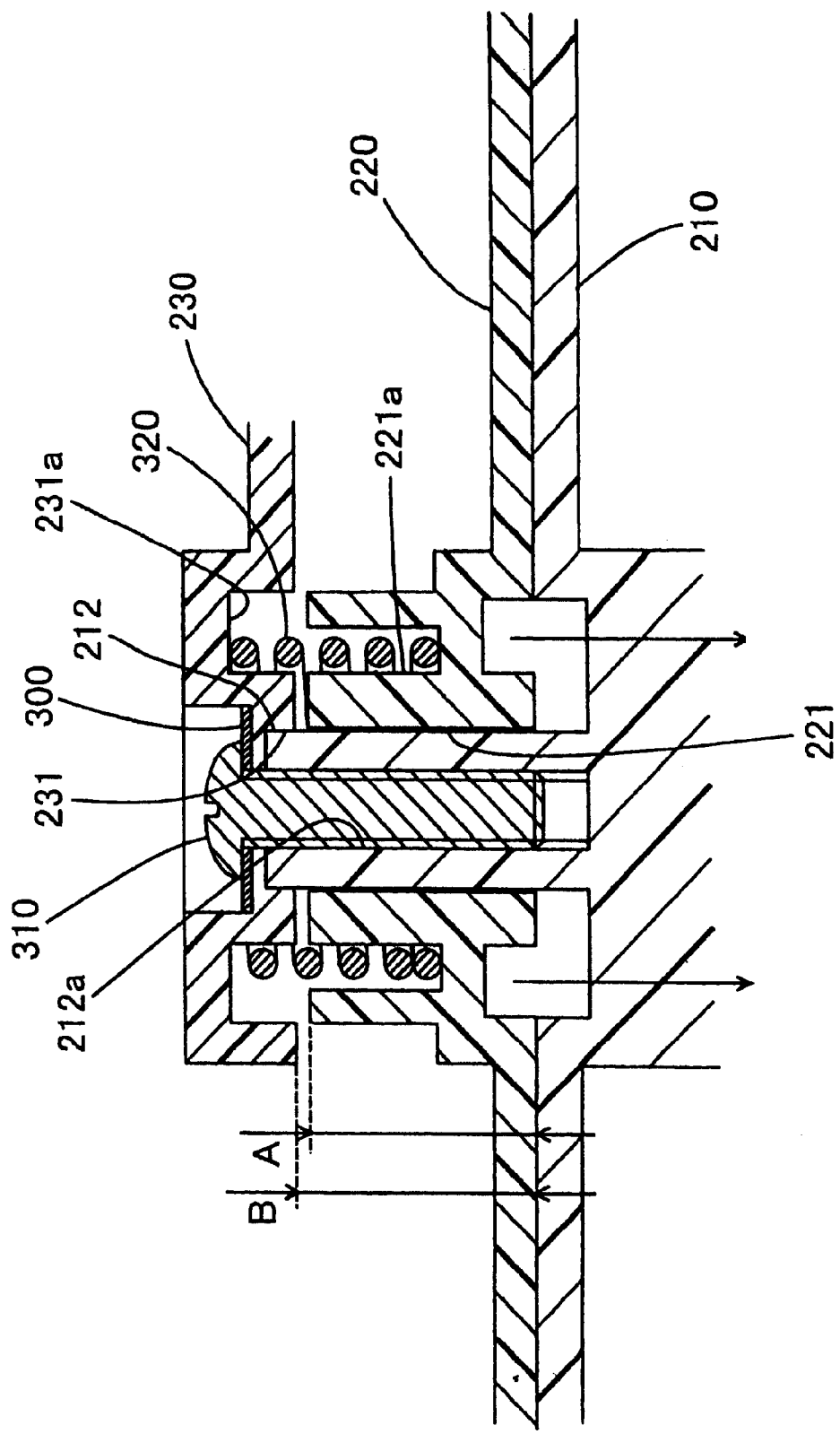
FIG. 5 is a sectional view showing an installed state of the rotary tray and the chuck arm relative to the slide tray.

In this embodiment, in view of the point just mentioned above, there is adopted a support shaft 212 of such a construction as shown in FIG. 5. As shown in the same figure, in the rotary tray 220, an annular recess 221a is formed around the tray axial bore 221, while in the chuck arm 230, an annular recess 231a able to confront the recess 221a is formed around the arm axial bore 231.

Then, a screw 310 with a washer fitted on its stem portion is inserted into the screw hole 212a from above the arm axial bore 231, the washer 300 having an outside diameter larger than the inside diameter of the screw hole 212a and having an opening diameter smaller than the screw head. At this time, a spring 320 is received in a space which is defined by both spaces 221a and 231a.

In this case, a height A from the lower surface of the rotary tray 220 to an upper opening position of the tray axial bore 221 is set smaller than a height B from the upper surface of the slide tray 210 to a lower surface of the chuck arm 230, so that a clearance corresponding to the difference in height (B-A) is formed between the chuck arm 230 and the rotary tray 220.

Therefore, the height of the chuck arm 230 relative to the slide tray 210 is determined by both washer 300 held between the upper end of the support shaft 212 and the head of the screw 310 and the upper surface of the rotary tray 220. With the biasing force of the spring 320, inner walls of the recesses 221a and 231a are urged away from each other, so that in the range of the clearance (B-A) the rotary tray 220 is pressed down in the vicinity of its axis. The support shaft 212 and the spring 320 constitute the support shaft structure referred to in the present invention.

Figure 6:
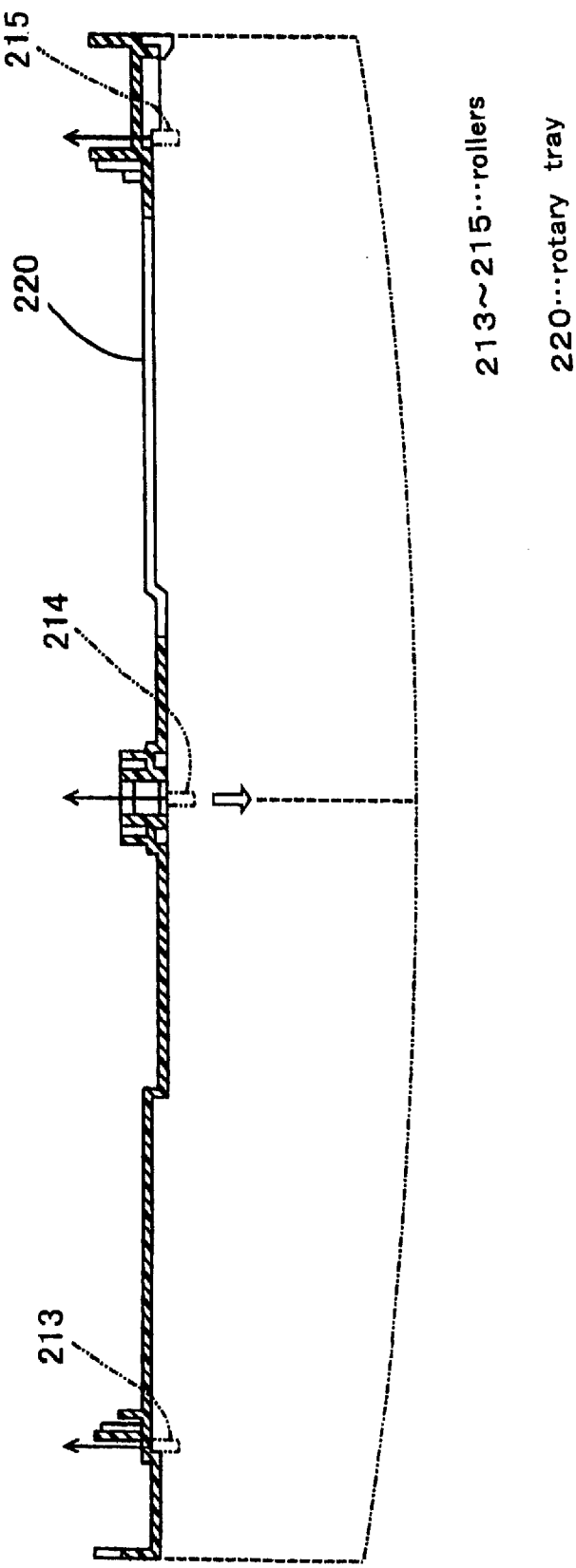
FIG. 6 is a side view for explaining a warp of the rotary tray which occurs at the time of installation.
Figure 7:
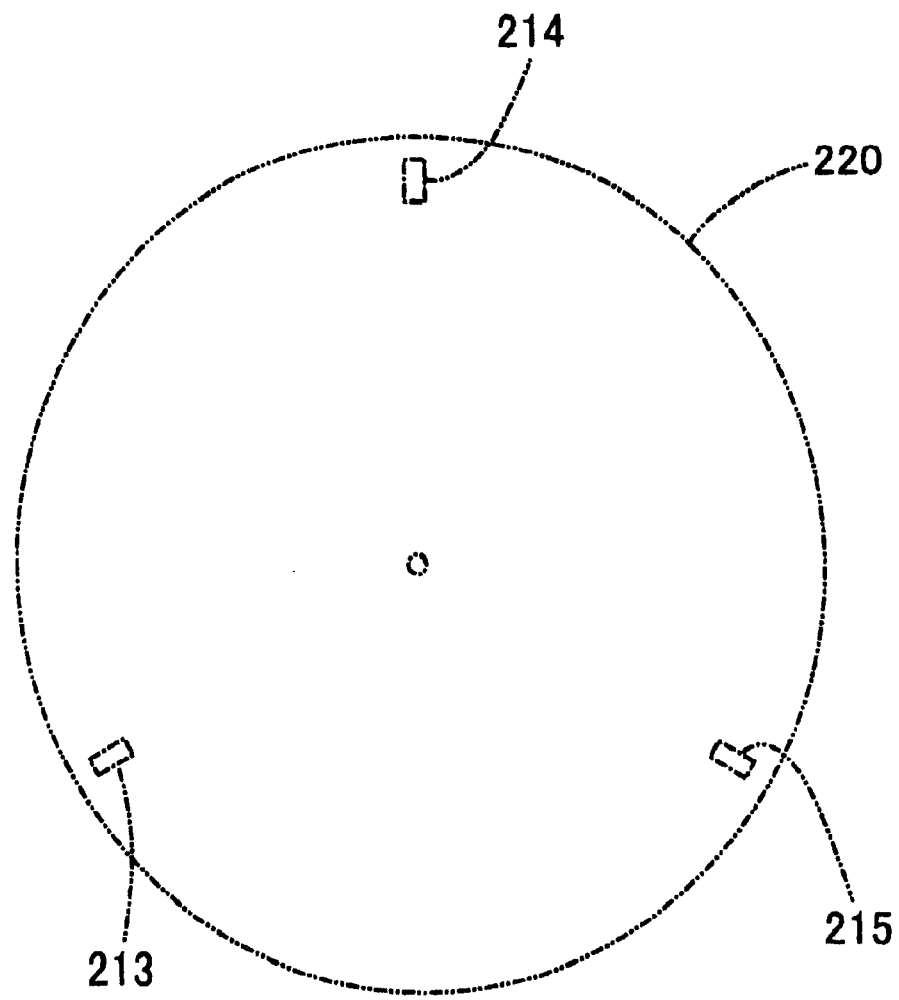
FIG. 7 is a plan view for explaining a warp of the rotary tray which occurs at the time of installation.

Consequently, as shown in FIGS. 6 and 7, the rotary tray 220 is displaced downward in the vicinity of its axis relative to its peripheral edge portion, while the peripheral edge of its lower surface and the vicinity thereof are supported from below by the rollers 213 through 215. As a result, the rotary tray 220 warps as a whole and absorbs undulation. Thus, a uniform rotating torque is imparted to the rotary tray 220, whereby it is possible to prevent the occurrence of unevenness in rotation. In the same figures, a dash-double dot line schematically illustrates a wholly warped state of the rotary tray 220.

(3) Modified Disk Changers

Figure 8:
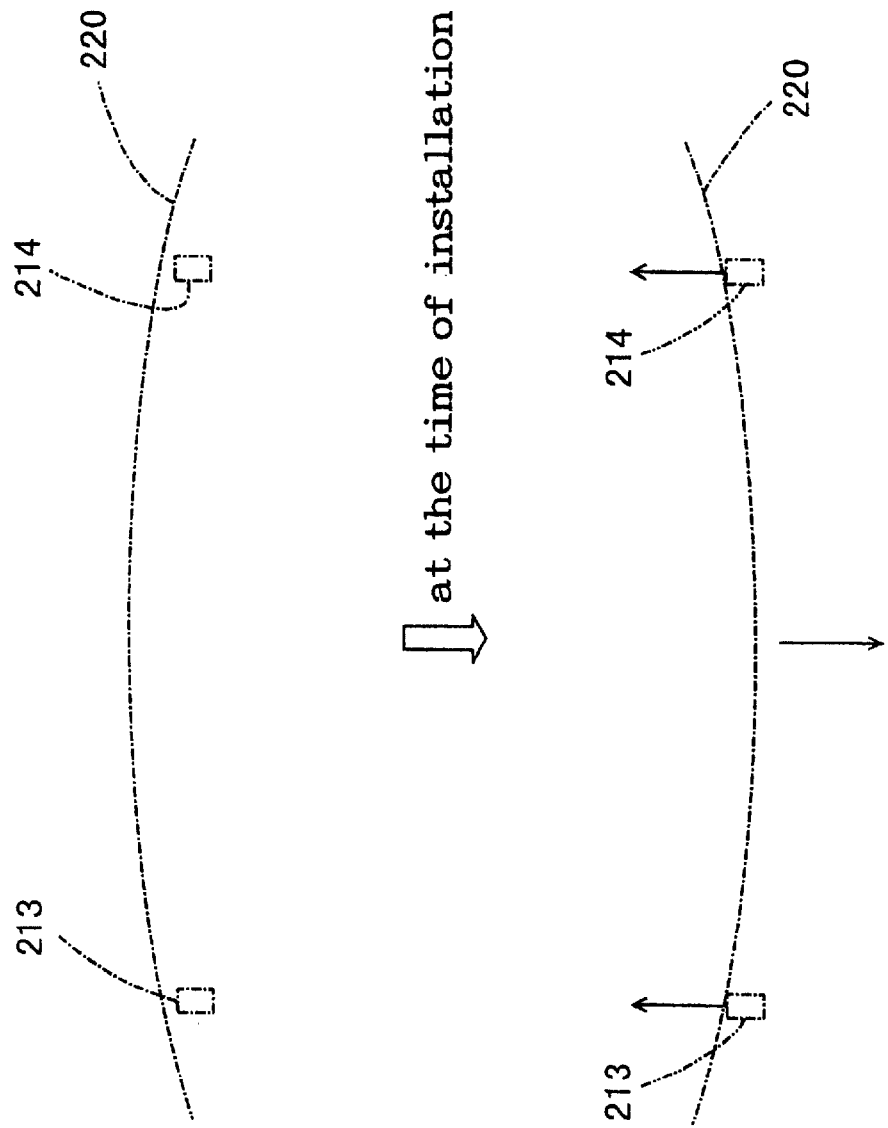
FIG. 8 is a schematic diagram showing a construction of a rotary tray according to a modification, as well as a change in shape at the time of installation.

The rotary tray 220 may be formed by molding in such a shape as shown in FIG. 8 to eliminate undulation of the rotary tray 220 in a more positive manner at the time of installation.

More specifically, the rotary tray 220 is formed by molding resin in a wholly warped state so as to project upward in the vicinity of its axis, and at the time of connecting the chuck arm 230 to the slide tray 210 with screw, the rotary tray 220 is pressed down in the vicinity of its axis to invert the warping direction, whereby the shape of the entire tray can be greatly changed while eliminating undulation and thus the rotating torque of the rotary tray is stabilized.

Figure 9:
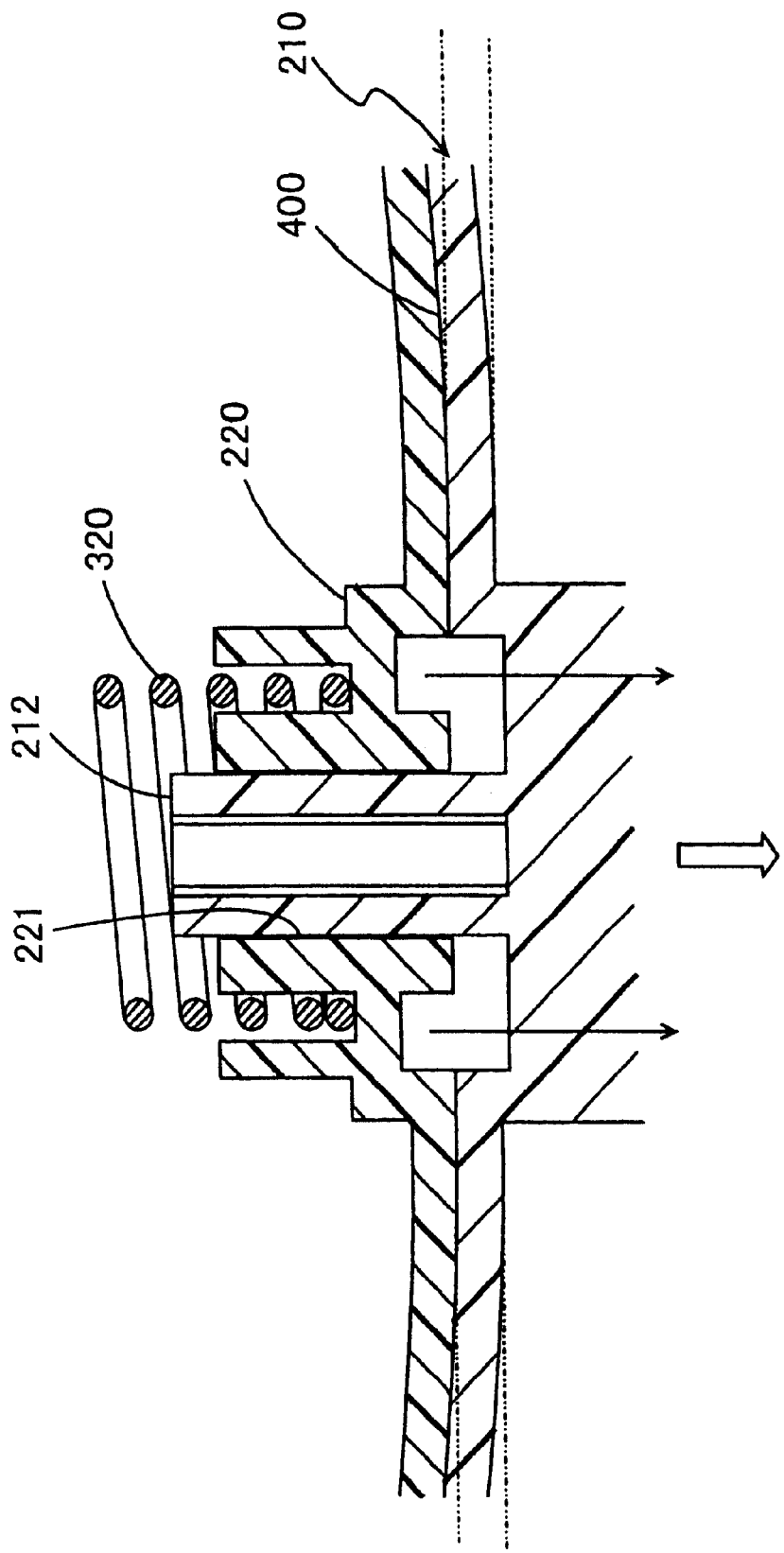
FIG. 9 is a partial sectional view showing an installed state of a rotary tray to a slide tray according to another embodiment.

As shown in FIG. 9, a recess 400 may be formed near the center of the slide tray 210, thereby making the rotary tray 220 easier to be displaced downward in the vicinity of its axis.

More specifically, a recess 400 having a downwardly displaced upper surface is formed near the center of the slide tray 210. At the time of installation, the rotary tray 220 is easily displaced downward in the vicinity of its axis along the shape of the recess 400 with the biasing force of the spring 320, with the result that the rotary tray 220 becomes easier to warp as a whole and hence it becomes possible to eliminate undulation effectively.

Thus, the rotary tray 220 is supported from below at the peripheral edge of its lower surface and thereabouts by means of rollers 213 through 215 which are arranged at equal intervals on a circumference centered at the support shaft 212, and is urged toward the supper surface of the slide tray 210 with the biasing force of the spring 320, so that the rotary tray 220 is installed warpedly in a downwardly convex shape as a whole. Consequently, undulation of the rotary tray 220 which occurred during resin molding is eliminated and the rotary tray 220 comes into uniform abutment against the rollers 213 through 215, thus making it possible to stabilize the rotating torque of the rotary tray and eliminate unevenness in its rotation.

What is claimed is:

1. A disk changer comprising:
    a slide tray made of resin in a square plate shape, the slide tray having a circular recess and rollers and being installed in a manner capable of being drawn out from a cabinet body, the circular recess being formed in an upper surface of the slide tray so as to face upward around a cylindrical support shaft, the rollers being arranged at equal intervals in three positions on a circumference on the upper surface of the slide tray which circumference is centered at the support shaft while allowing rotating shafts of the rollers to be oriented radially of the circular recess;
    a disk tray made of resin, the disk tray having a tray axial bore formed axially thereof and into which the support shaft is inserted rotatably, an annular recess formed in an upper surface of the disk tray in a surrounding relation to the tray axial bore, disk receptacle portions formed circumferentially at equal intervals in five positions on the upper surface of the disk tray, and a ring gear disposed on a circumference on a lower surface of the disk tray which circumference is centered at the tray axial bore, the ring gear being engageable with a driving gear, the disk tray being placed in the circular recess of the slide tray while being supported at a peripheral edge of its lower surface and thereabouts by means of the rollers; and
    a chuck arm made of resin, the chuck arm having an arm axial bore formed on one end side thereof and into which the support shaft is inserted, an annular recess formed in a lower surface of the chuck arm in a surrounding relation to the arm axial bore, the annular recess being able to confront the annular recess formed in the disk tray, and a through hole formed on an opposite side of the chuck arm and able to confront a central part of each of the disk receptacle portions, the chuck arm being mounted to the support shaft while allowing a spring to be accommodated within a space which is formed by making the annular recesses confront each other, the spring being disposed so that it can expand and contract axially of the support shaft.

2. A disk changer comprising:
    a disk tray which accommodates a plurality of disks on a surface thereof;
    a drive mechanism for rotating the disk tray;
    a slide tray having a plurality of rollers which support the disk tray rotatably on a back side of the disk tray; and
    a support shaft structure which urges the disk tray toward the slide tray while supporting the disk tray rotatably about an axis of the disk tray relative to the slide tray.

3. A disk changer according to claim 2, wherein the support shaft structure is provided with a spring, the spring being able to expand and contract in the axial direction of the disk tray, one end of the spring being spaced a predetermined distance from the slide tray and positioned there, an opposite end of the spring acting against the disk tray in a vicinity of the disk tray axis from the side opposite to the slide tray.

4. A disk changer according to claim 2, wherein the disk tray is formed by molding while the vicinity of the disk tray axis is displaced away from the slide tray, causing the whole of the disk tray to be warped in an arcuate sectional shape.

5. A disk changer according to claim 2, wherein the slide tray portion opposed to the vicinity of the disk tray axis is depressed as a recess in a direction away from the disk tray.

6. A disk changer comprising:
    a slide tray made of resin in a square plate shape, the slide tray having a circular recess and being installed in a manner capable of being drawn out from a cabinet body, the circular recess being formed in an upper surface of the slide tray so as to face upward around a cylindrical support shaft;
    a disk tray made of resin, the disk tray having a tray axial bore formed axially thereof and into which the support shaft is inserted rotatably, an annular recess formed in an upper surface of the disk tray in a surrounding relation to the tray axial bore, disk receptacle portions formed circumferentially at equal intervals in five positions on the upper surface of the disk tray, and a ring gear disposed on a circumference on a lower surface of the disk tray which circumference is centered at the tray axial bore, the ring gear being engageable with a driving gear, the disk tray being placed in the circular recess of the slide tray; and
    a chuck arm made of resin, the chuck arm having an arm axial bore formed on one end side thereof and into which the support shaft is inserted, an annular recess formed in a lower surface of the chuck arm in a surrounding relation to the arm axial bore, the annular recess being able to confront the annular recess formed in the disk tray, and a through hole formed on an opposite side of the chuck arm and able to confront a central part of each of the disk receptacle portions, the chuck arm being mounted to the support shaft while allowing a spring to be accommodated within a space which is formed by making the annular recesses confront each other, the spring being disposed so that it can expand and contract axially of the support shaft.

7. A disk changer comprising:
    a disk tray which accommodates a plurality of disks on a surface thereof, the disk tray having a recess formed on a back side about a rotational axis of the disk tray;
    a drive mechanism for rotating the disk tray;
    a slide tray which supports the disk tray rotatably on the back side of the disk tray, the slide tray having a recess formed on an upper surface facing the recess on the back side of the disk tray; and a support shaft structure which urges the disk tray toward the slide tray while supporting the disk tray rotatably about an axis of the disk tray relative to the slide tray, wherein the disk tray recess and slide tray recess form a closed space when the disk tray is urged against the slide tray.

* * * * *